(12) United States Patent
Ishii et al.

(10) Patent No.: US 6,192,755 B1
(45) Date of Patent: Feb. 27, 2001

(54) DIAL GAUGE CASING AND METHOD OF MANUFACTURING THE SAME

(75) Inventors: Munenori Ishii; Toshiyuki Shinohara, both of Utsunomiya (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 08/934,668

(22) Filed: Sep. 22, 1997

(30) Foreign Application Priority Data

Sep. 26, 1996 (JP) ..................................... 8-254577

(51) Int. Cl.⁷ ............................. G01L 19/14; G01D 11/24
(52) U.S. Cl. ................................ 73/431; 33/517; 206/305
(58) Field of Search ............................... 73/431; 33/501, 33/517; 264/135; 206/305

(56) References Cited

U.S. PATENT DOCUMENTS

| | | | |
|---|---|---|---|
| 3,226,836 | * | 1/1966 | Bond ...................................... 33/172 |
| 3,338,103 | * | 8/1967 | Lohrs et al. ............................. 73/431 |
| 4,489,496 | * | 12/1984 | Mizuno et al. .................... 33/172 R |

* cited by examiner

Primary Examiner—Hezron Williams
Assistant Examiner—Michael Cygan
(74) Attorney, Agent, or Firm—Oliff & Berridge, PLC

(57) ABSTRACT

A dial gauge case, which has a bottom and a peripheral wall surrounding the bottom, the bottom and the peripheral wall defining a recess for accommodating a dial gauge mechanism therein. The peripheral wall is provided with a pair of bearings for slidably supporting a spindle of the dial gauge. The peripheral wall and the pair bearings are formed together as a one-piece molding of a plastic material. With the peripheral wall and the bearings formed together as a one-piece molding, the number of dial gauge components can be reduced, and the operation of assembling the dial gauge is simplified.

16 Claims, 11 Drawing Sheets

DIAL GAUGE CASING AND METHOD OF MANUFACTURING THE SAME

BACKGROUND OF THE INVENTION

1. Field of the Invention

This invention relates to a dial gauge case, which can be utilized for a usual dial gauge for magnifying a stroke or displacement of a spindle with a magnifying mechanism such as a rack-and-pinion assembly.

2. Description of the Prior Art

A usual dial gauge magnifies a stroke or displacement of a spindle having a probe or measuring pin provided at an end with a pinion-and-rack assembly or like magnifying mechanism, and displays the magnified stroke or displacement as a corresponding rotation of a pointer.

Such a dial gauge permits even a very small displacement of the probe to be confirmed as a great rotation of the pointer, thus permitting high accuracy measurement.

FIGS. 10 and 11 show a well-known dial gauge 10.

The illustrated dial gauge 10 comprises a dial gauge case 40, which accommodates a dial gauge mechanism including a scale board 20 and a pointer 30, and a spindle 50 penetrating a peripheral wall 41 of the case 40.

A cylindrical stem 60 projects outward from the peripheral wall 41, and accommodates the spindle 50.

The stem 60 protects the spindle 50, and serves a mounting portion to be mounted in a support which supports the dial gauge 10.

The inside of the dial gauge case 40 is as shown in FIG. 12. In the case 40 and the stem 60, bearings 42 and 64 are provided such that they face each other in the direction of sliding of the spindle 50, thus permitting smooth sliding of the spindle 50.

In the above usual dial gauge 10, the case 40 is fabricated as a one-piece casting of zinc, and the bearings 42 and 64 are fabricated by using bronze or like material having satisfactory frictional properties.

In the assembling of the dial gauge 10, therefore, it is necessary to mount the bearings 42 and 64 in the peripheral wall 41 and the stem 60, respectively, giving rise to the problem that the efficiency of dial gauge manufacture is reduced with increased number of parts and increased number of assembling steps.

It is conceivable to fabricate the case 40 and bearings 42 and 64 altogether as a one-piece molding of bronze. Doing so, however, results in an extreme increase of the material cost of the case 40.

The invention seeks to solve the above problems, and it has an object of providing a dial gauge case, which permits reducing the number of dial gauge components and improving the efficiency of dial gauge manufacture without greatly increasing the material cost of the dial gauge.

SUMMARY OF THE INVENTION

The invention features a dial gauge case, which has a bottom and a peripheral wall surrounding the bottom, the bottom and the peripheral wall defining a recess for accommodating a dial gauge mechanism therein, the peripheral wall being provided with a pair of bearings for slidably supporting a spindle of the dial gauge, the peripheral wall and the bearings being formed together as a one-piece molding of a plastic material.

According to the invention, with the peripheral wall and the bearings formed together as a one-piece molding, the number of components involved in the assembling of the dial gauge can be reduced, thus simplifying the operations of assembling the peripheral wall and the bearings and improving the efficiency of the dial gauge manufacture.

In addition, since the peripheral wall is obtained from a plastic material, the material cost of the dial gauge is not greatly increased, and the weight thereof can be reduced.

The plastic material is preferably a reinforced plastic, which is obtain by reinforcing a synthetic resin composed of polyphenylene sulfide (hereinafter referred to as PPS) with a member of the group consisting of carbon fiber, glass fiber, potassium titanate whisker and aluminum borate whisker.

By using PPS, a case having high heat resistance and high wear resistance is obtainable, and by reinforcing PPS with carbon fiber or the like, a case having high mechanical strength is obtainable.

Carbon fiber, potassium titanate whisker or aluminum borate whisker used as reinforcing material, not only improves the mechanical strength of the case, but also functions as a frictional material. It is thus possible to obtain bearings, which permit satisfactory sliding and are also excellent in wear resistance.

The plastic material used as the bearing material is obtained by reinforcing PPS with carbon fiber, potassuim titanate whisker or aluminum borate whisker. A reinforced plastic, used for the remainder of the case is obtained by reinforcing PPS with glass fiber.

The glass-fiber-reinforced plastic is used for the case portion and not the bearings, allowing a minimum amount of expensive reinforcing material such as carbon fiber to be used thus reducing the material cost of the case.

Where a stem accommodating a spindle is provided on the dial gauge case, a bearing is suitably provided at the stem end or the inside of the stem.

With the bearing provided at the stem end, no bearing need be provided at the free end of the stem, thus permitting simplification of the dial gauge assembling as described before in connection with the prior art. With one of the bearings provided inside the stem, on the other hand, it is possible to provide a sufficient distance between the pair of bearings, so that the spindle can be supported more reliably.

Where one of the bearings is provided inside the stem, the stem is formed with one or more holes in the vicinity of its stem end for coupling the peripheral wall and the bearing through the hole or holes.

With a hole or holes formed in the stem end, synthetic resin is led through the hole or holes to the stem. It is thus possible to readily fabricate the case with the bearing formed inside the stem. Thus, the distance between the pair of bearings in the direction of sliding of the spindle can be set to be sufficiently large for supporting the spindle in the bearings more reliably.

Moreover, with the peripheral wall and the bearing coupled together through the hole or holes provided in the stem end, the stem is mechanically connected to the case, and it is possible to reliably preclude detachment of the stem from the peripheral wall.

The invention also features a method of manufacturing a dial gauge case, which has a bottom and a peripheral wall surrounding the bottom, the bottom and the peripheral wall defining a recess for accommodating a dial gauge mechanism therein, the peripheral wall being formed together with a pair of cylindrical bearings for slidably supporting the spindle as a one-piece molding, the method including fabricating the cylindrical bearings from a reinforced plastic obtained by reinforcing a synthetic resin composed of a polyphenylene sulfide with a member of the group consisting of carbon fiber, potassium titanate whisker and aluminum borate whisker, and molding the case from a plastic material with the bearings set in a die by insert molding, thereby making the peripheral wall and the bearings integral with one another.

With the bearing fabricated form the material different from that of the case and made integral with the case when molding the case, it is possible to use an expensive reinforcing material such as carbon fiber only for the bearing, which should provide for improved sliding property, while using inexpensive glass fiber for the remainder of the case. The expensive reinforcing material such as carbon fiber thus can be used only in a minimum necessary amount, thus permitting reduction of the material cost of the case.

DETAILED DESCRIPTION OF THE PREFERRED EMBODIMENT(S)

A first embodiment of the dial gauge case according to the invention will now be described with reference to the drawings. Parts similar to those which have already been described, will be described briefly or not be described.

Figure 1:
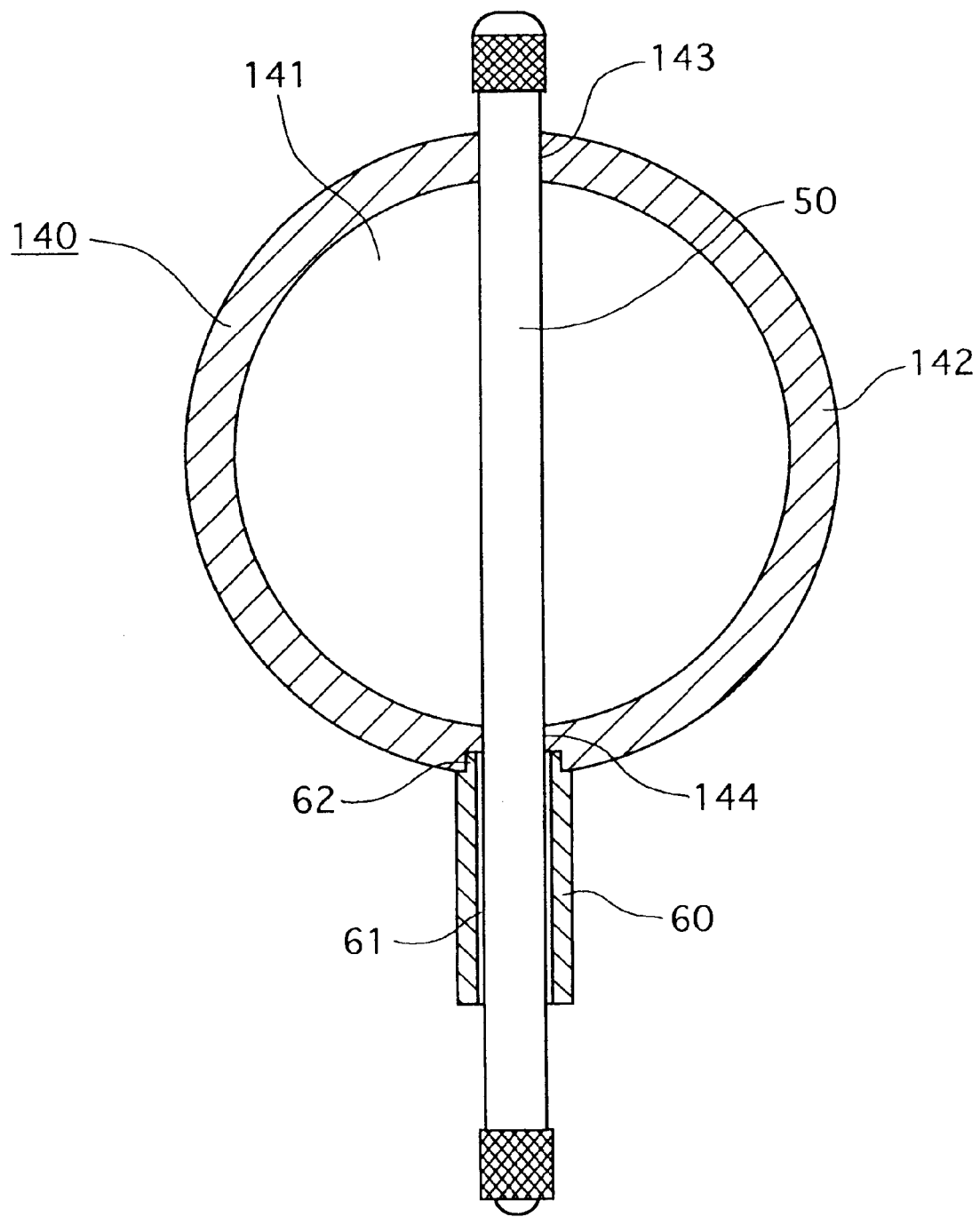
FIG. 1 is a sectional view showing a first embodiment of the dial gauge case according to the invention.

FIG. 1 is a view of the first embodiment of the case.

The first embodiment of the case 140 includes a bottom 141 and a peripheral wall 142 surrounding the bottom 141. A cylindrical metal stem 60 is provided on the peripheral wall 142 such that it projects outward, i.e., downward in FIG. 1. A spindle 50 penetrates the peripheral wall 142 and is accommodated in the inside 61 of the stem 60, and it is supported for sliding relative to the peripheral wall 142. Although not shown in FIG. 1, an enlarging mechanism comprising a rack-and-pinion assembly, is accommodated as a dial gauge mechanism in the peripheral wall 142.

The peripheral wall 142 has bearings 143 and 144 in its surfaces in contact with the spindle 50. The peripheral wall 142 and the bearings 143 and 144 are fabricated as a one-piece molding of a plastic material, which is obtained by reinforcing PPS with carbon fiber. The stem 60 has a stem end 62 connected to a lower portion of the peripheral wall 142 under the bearing 144 in FIG. 1.

Figure 2:
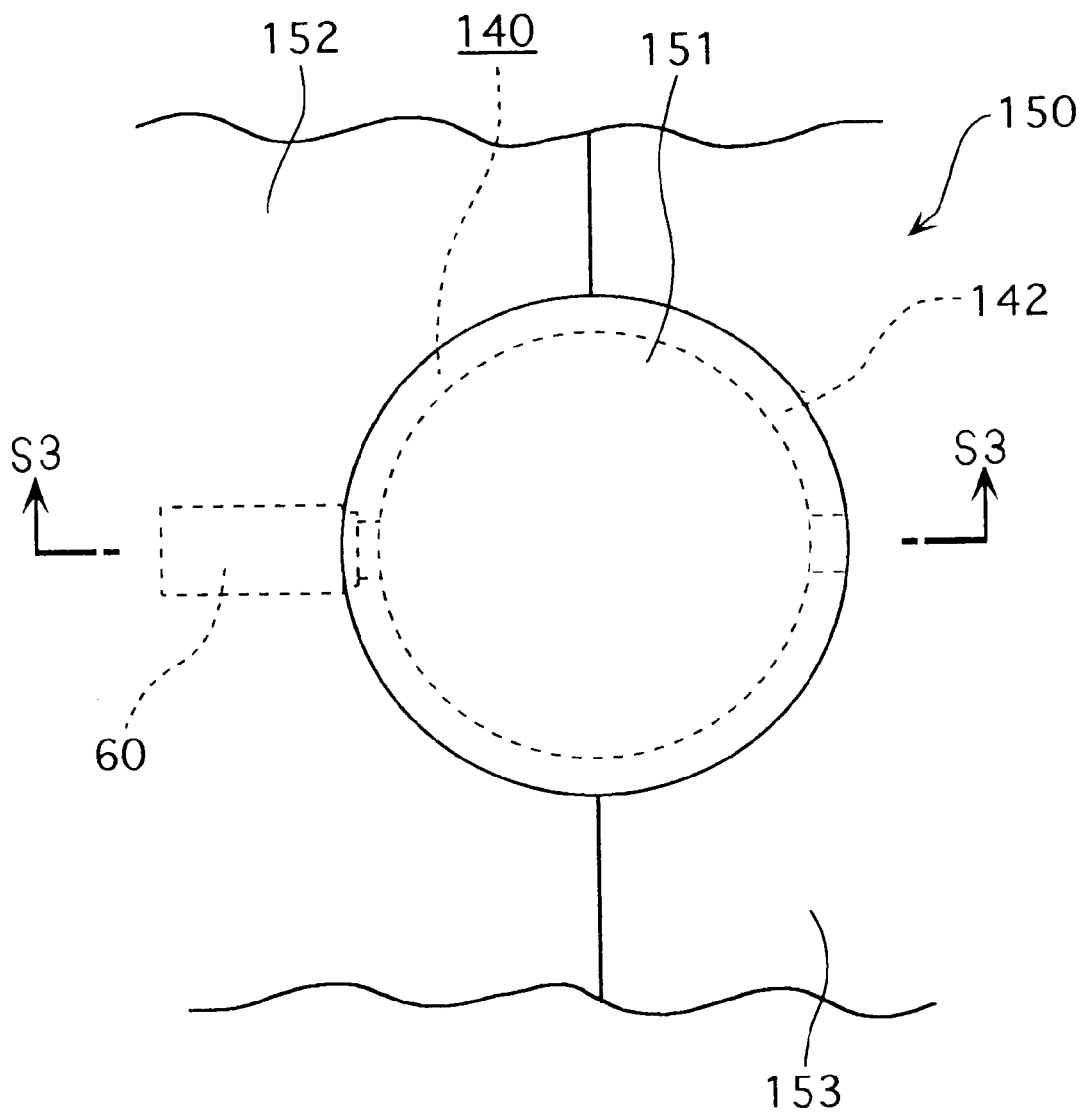
FIG. 2 is a top view showing a die for molding the same embodiment of the case.
Figure 3:
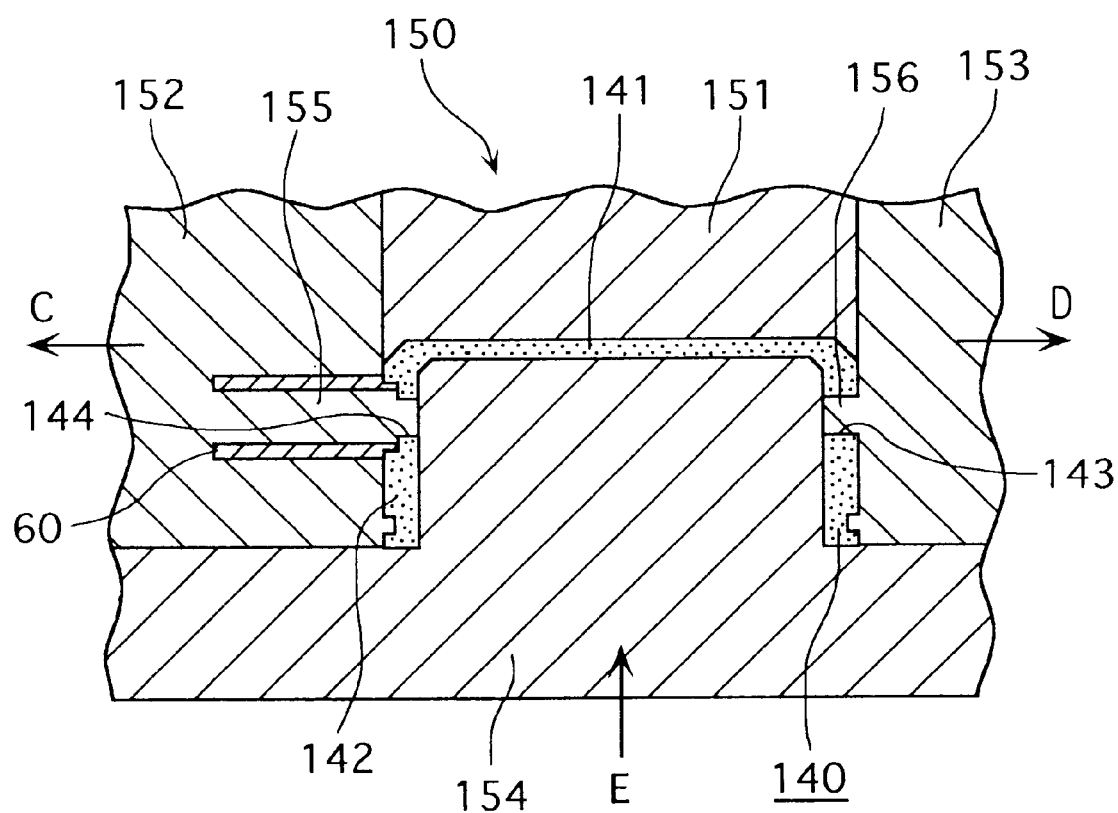
FIG. 3 is a sectional view the die for molding the same embodiment of the case.

This case 140 is fabricated as a one-piece molding using a die 150 as shown in FIGS. 2 and 3. The stem 60 is formed by insert molding. That is, it is embedded in and bonded to the peripheral wall 142 simultaneously with the molding of the case 140.

The die 150 for molding the case 140 includes a stationary die member 151 serving to form the bottom 141 of the case 140, slidable die members serving to form the outer periphery of the peripheral wall 142, and a movable die member 154 serving to form the recess defined by the bottom 141 and the peripheral wall 142. The slidable die members 152 and 153 are movable in directions C and D, respectively, and the movable die member 154 is movable in direction E.

The stem 60 is set in the left slidable die member 152 in FIGS. 2 and 3. The left slidable die member 152 has a core pin 155 for forming the bearing 144 at the stem end of the stem 60. The left slidable die member 153 in FIGS. 2 and 3 has a core pin 156 for forming the bearing 143.

To mold the case 140, the stem 60 is fitted on the core pin 155 with the slidable die members 152 and 153 held pulled away in the directions C and D, respectively. Then, the slidable die members 152 and 153 are moved toward each other so that they can form the outer periphery of the peripheral wall 142, and the movable die member 154 is moved upward. Then, plastic material composed of PPS and carbon fiber is injected into the cavity defined by the die members. Thus, the peripheral wall 142, the bearings 143 and 144 and the bottom 141 are formed together as a one-piece molding, and at the same time the stem 60 is bonded to the peripheral wall 142.

With the first embodiment as described above, the following effects are obtainable.

Since the peripheral wall 142 and the bearings 143 and 144 are formed together as a one-piece molding, it is possible to reduce the number of components assembled in the operation of assembling the dial gauge, thus simplifying the assembling operation and improving the efficiency of the dial gauge manufacture.

In addition, since the case 140 is fabricated by using a plastic material, the material cost is not greatly increased.

The adopting of the insert molding permits further improvement of the efficiency of the dial gauge manufacture for the mounting of the stem 60 is effected simultaneously with the molding of the case 140.

Since the case 140 is fabricated by using a reinforced plastic material, which is obtained by reinforcing PPS with carbon fiber, the mechanical strength of the case can be increased. The adopting of carbon fiber permits further improvement of the property of the bearings 143 and 144 to permit sliding.

Since the bearing 144 is formed together with the peripheral wall 142 at the stem end of the stem 60, no separate bearing need be provided in the inside of the stem 60, thus simplifying the dial gauge assembling operation and further improving the efficiency of the dial gauge manufacture.

Figure 4:
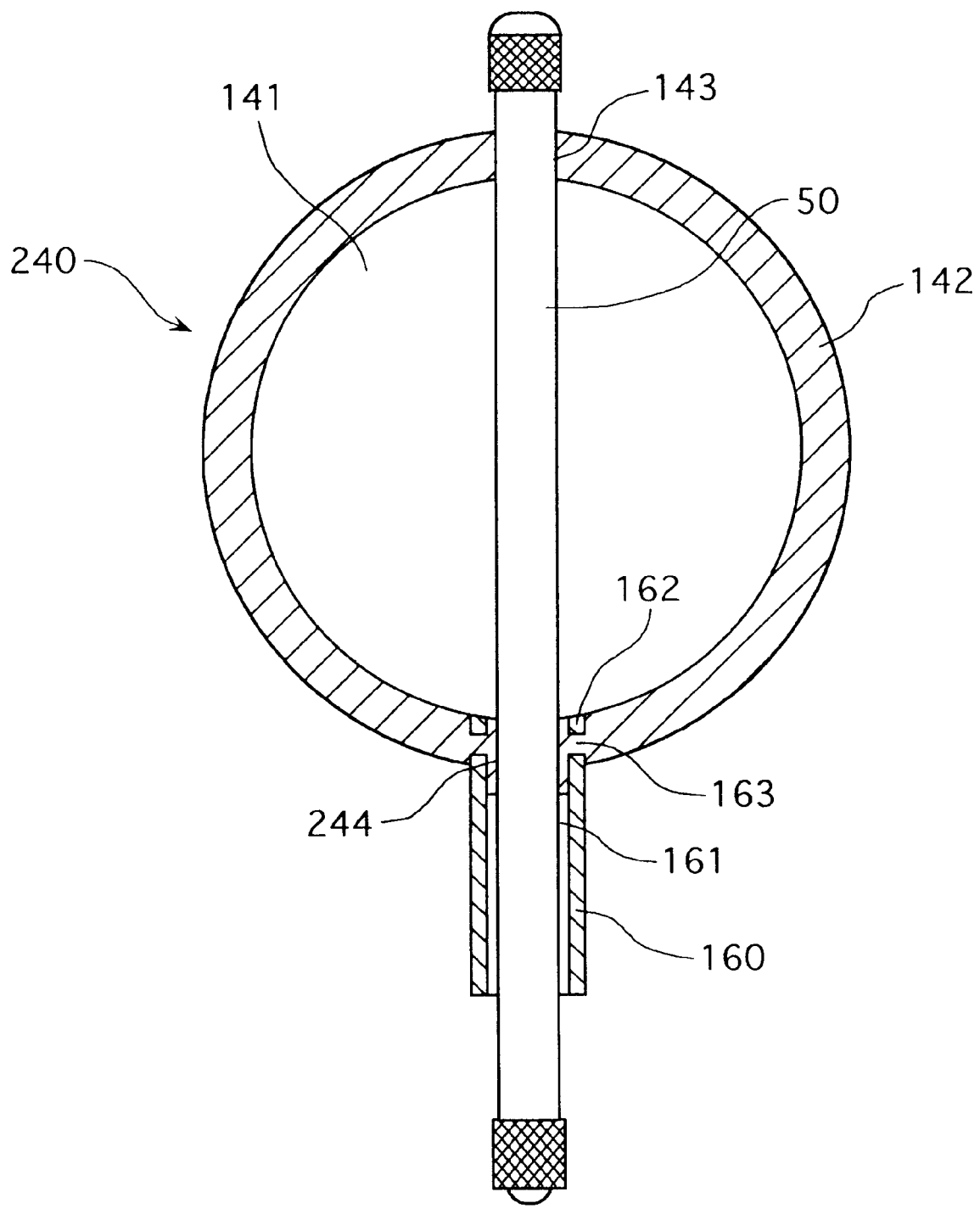
FIG. 4 is a sectional view showing a second embodiment of the dial gauge case according to the invention.
Figure 5:
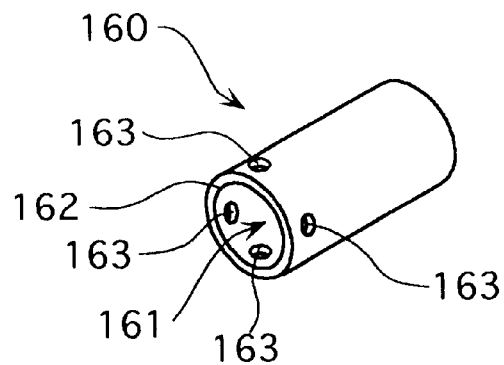
FIG. 5 is a schematic perspective view showing a stem in the same embodiment.

FIGS. 4 and 5 show a second embodiment of the case 240 according to the invention. This embodiment is different from the first embodiment of the case 140 in the stem 160 and the bearing 244.

Specifically, the second embodiment uses a stem 160 as shown in FIG. 5, which is provided on the peripheral wall 141 such that it projects outward therefrom. The stem 160 has holes 163 formed in the vicinity of its stem end 162 and penetrating its cylindrical wall.

The bearing 244 is provided in the inside 161 of the stem 160, and is mechanically connected to the peripheral wall 142 by the resin led to it through the holes 163.

Figure 6:
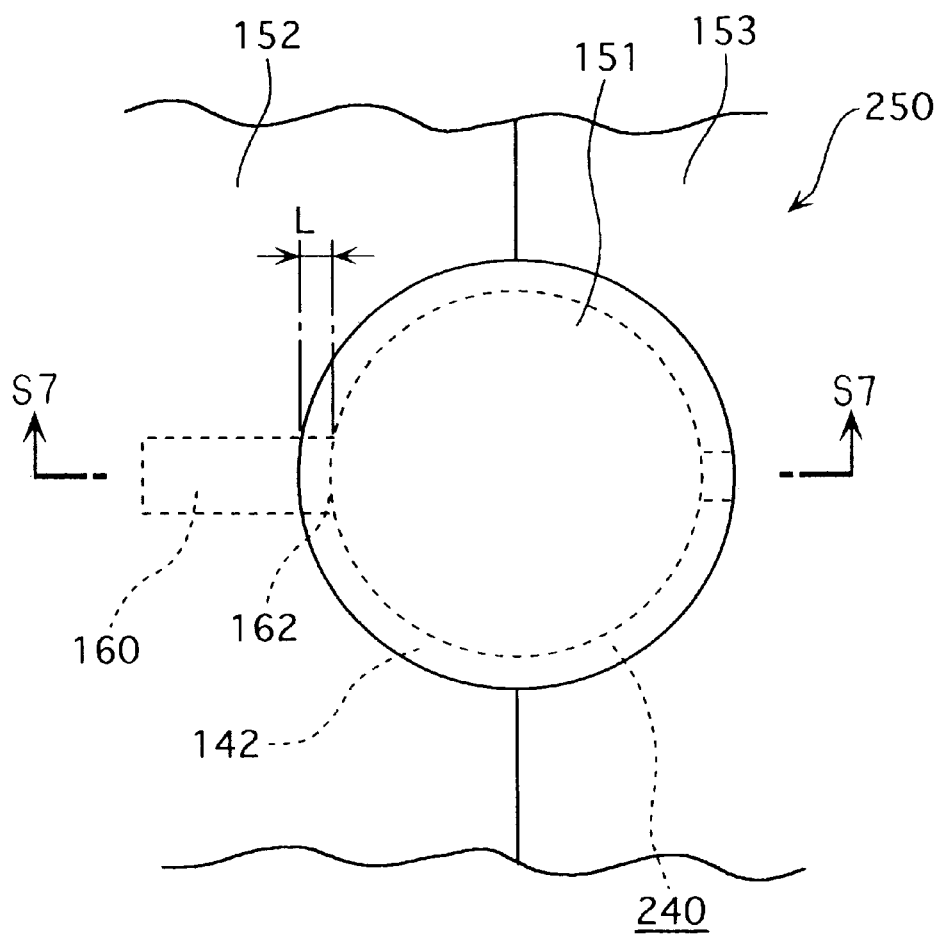
FIG. 6 is a top view showing a die for molding the same embodiment of the case.
Figure 7:
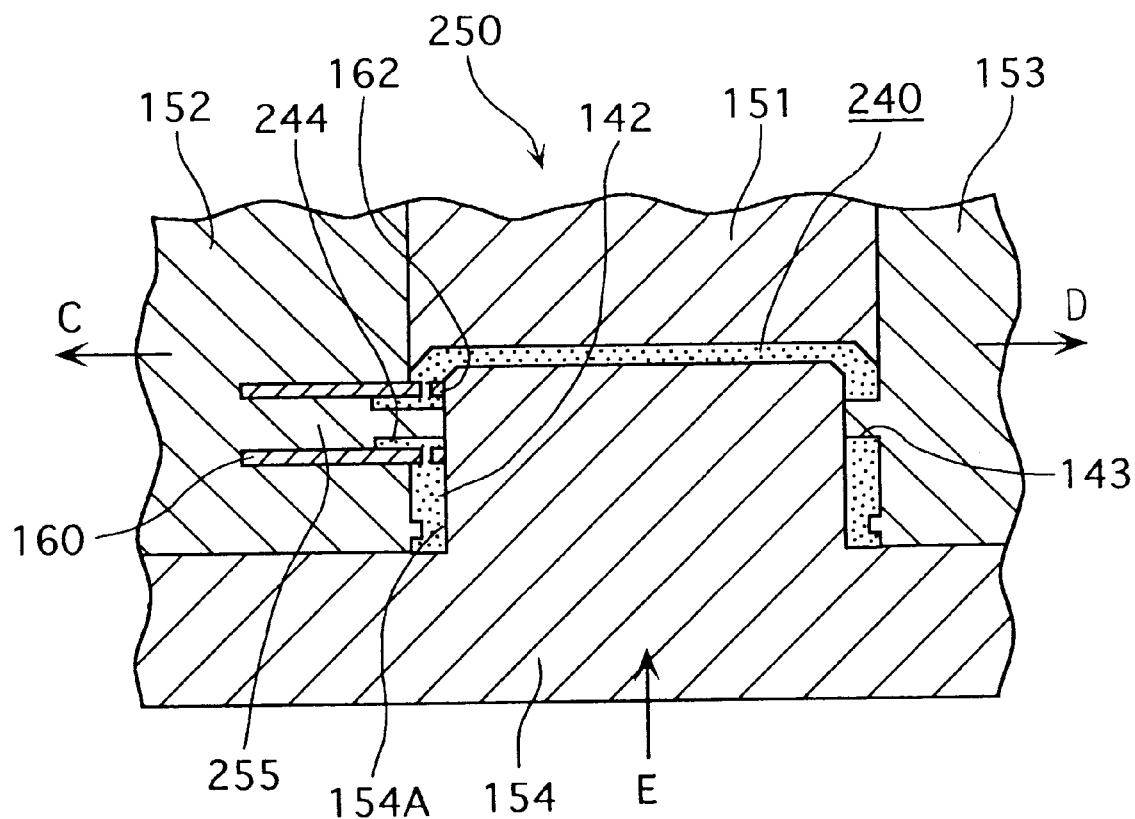
FIG. 7 is a sectional view showing the die for molding the same embodiment of the case.

The second embodiment of the case 240 is fabricated by using a die 250 as shown in FIGS. 6 and 7.

This die 250 is different from the die 150 concerning the first embodiment in that the stem end 162 of the stem 160 is in contact with the peripheral surface 154A of the movable die member 154 when the stem 160 has been set on the core pin 255.

With this second embodiment of the dial gauge case 240, the following effects are obtainable in addition to the effects described before in connection with the first embodiment.

Since the bearing 244 is provided in the inside 161 of the stem 160, it is possible to take a sufficiently large distance between the pair bearings 244 and 243 and reliably support the spindle 50.

Since the stem 160 has the holes 163 formed in the vicinity of its stem end 162 and mechanically connected to the peripheral wall 142 by the coupling of the two through the holes 163, it is possible to reliably preclude the detachment of the stem 160 from the peripheral wall 142.

Besides, with the bearing 244 provided inside the stem 160 through the holes 163, the stem 160 can be embedded in the peripheral wall 142 through the entire thickness L thereof, as shown in FIGS. 6 and 7. The areas of bonding between the stem 160 and the peripheral wall 142 are thus increased to improve the mechanical strength of the support of the stem 160 by the peripheral wall 142.

Moreover, for the insert molding of the stem 160, the stem 160 can be set such that its stem end 162 is in contact with the peripheral wall 154A of the movable die member 154. This means that when the stem 160 has been set on the core pin 255, the depth of embedding of the stem 160 in the peripheral wall 142 can be confirmed. Stable mechanical strength of connection between the stem 160 and the peripheral wall 142 is thus obtainable.

Figure 8:
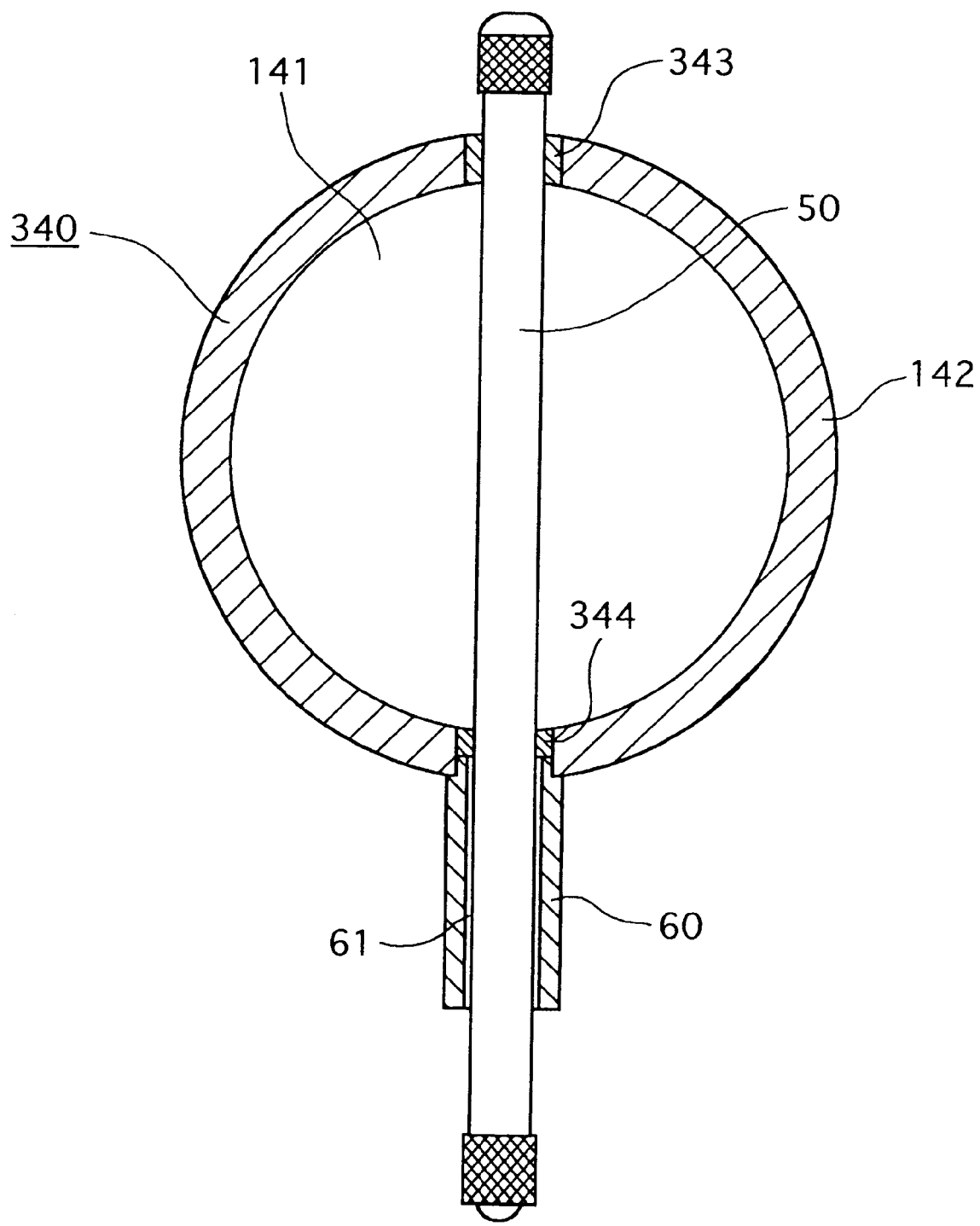
FIG. 8 is a sectional view showing a third embodiment of the dial gauge case according to the invention.

FIG. 8 shows a third embodiment of the dial gauge case. This embodiment is different from the first embodiment in that the bearings 343 and 344 are formed separately from and of a different material from the remainder of the case 340.

Specifically, in this embodiment the bearings 343 and 344 are made of a reinforced plastic, which is obtained by reinforcing PPS with carbon fiber, and the remainder of the case 340 (i.e., the bottom 141 and the peripheral wall 142) is made of FRP obtained by reinforcing PPS with glass fiber.

Figure 9:
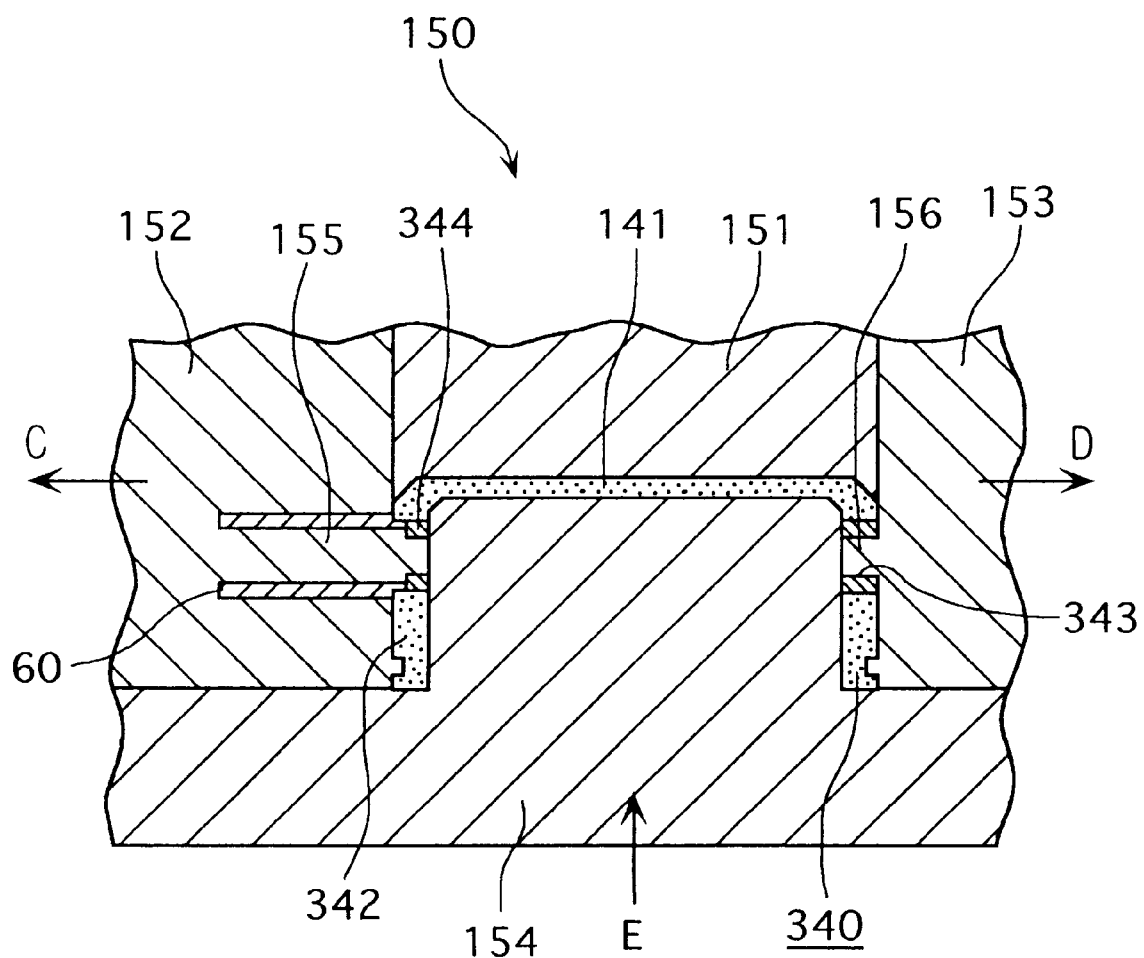
FIG. 9 is a sectional view showing a die for molding the same embodiment of the case.
Figure 10:
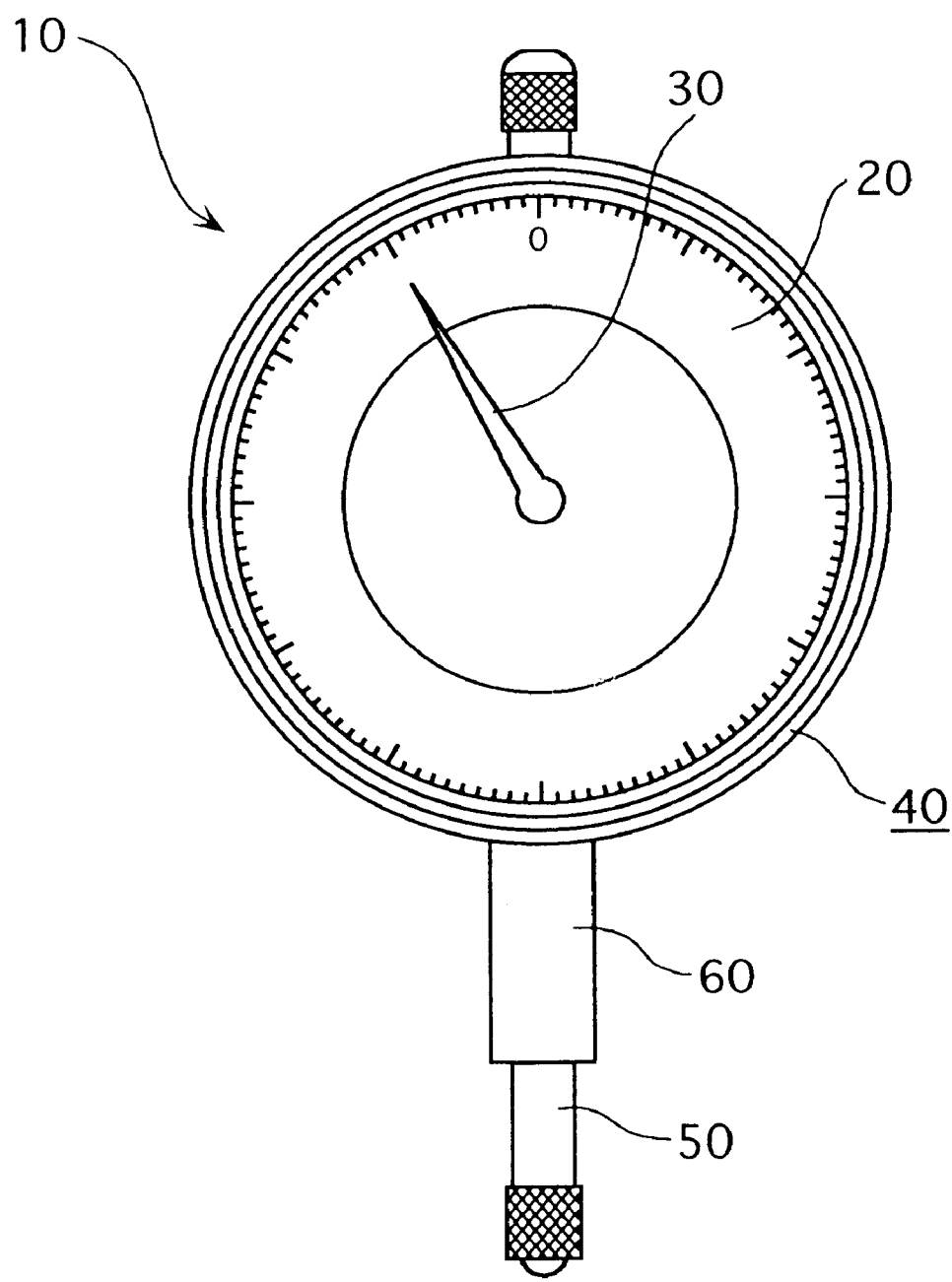
FIG. 10 is a front view showing a dial gauge assembled with a case in the prior art.
Figure 11:
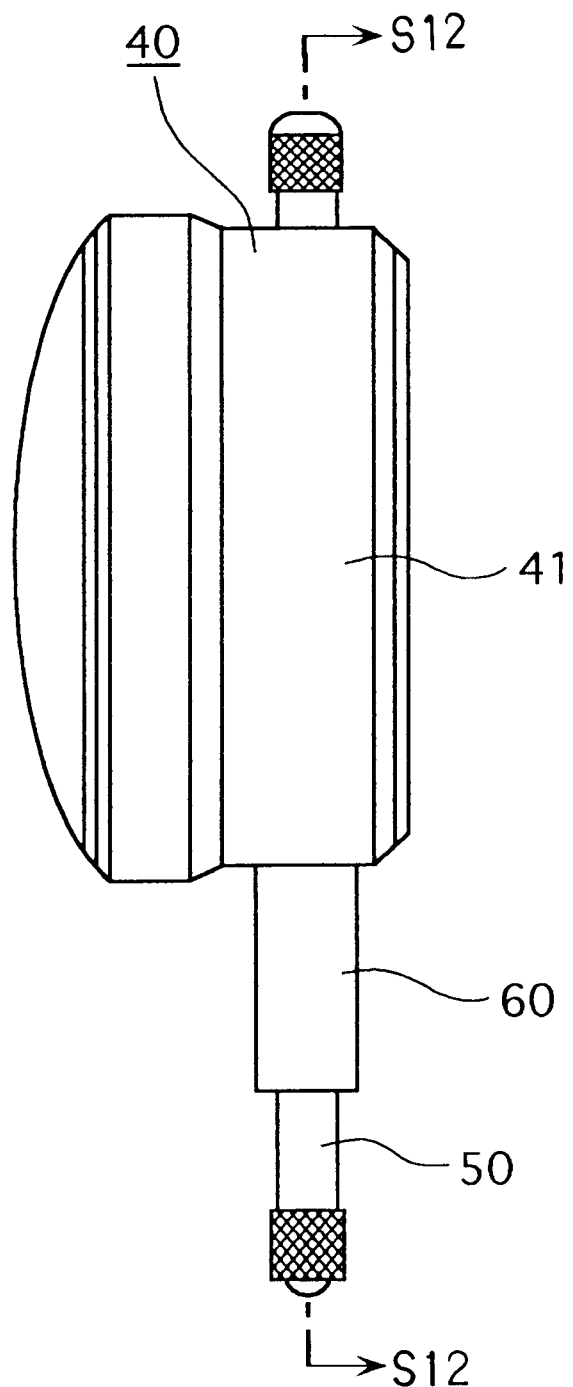
FIG. 11 is a side view showing the same dial gauge assembled with the prior art case.
Figure 12:
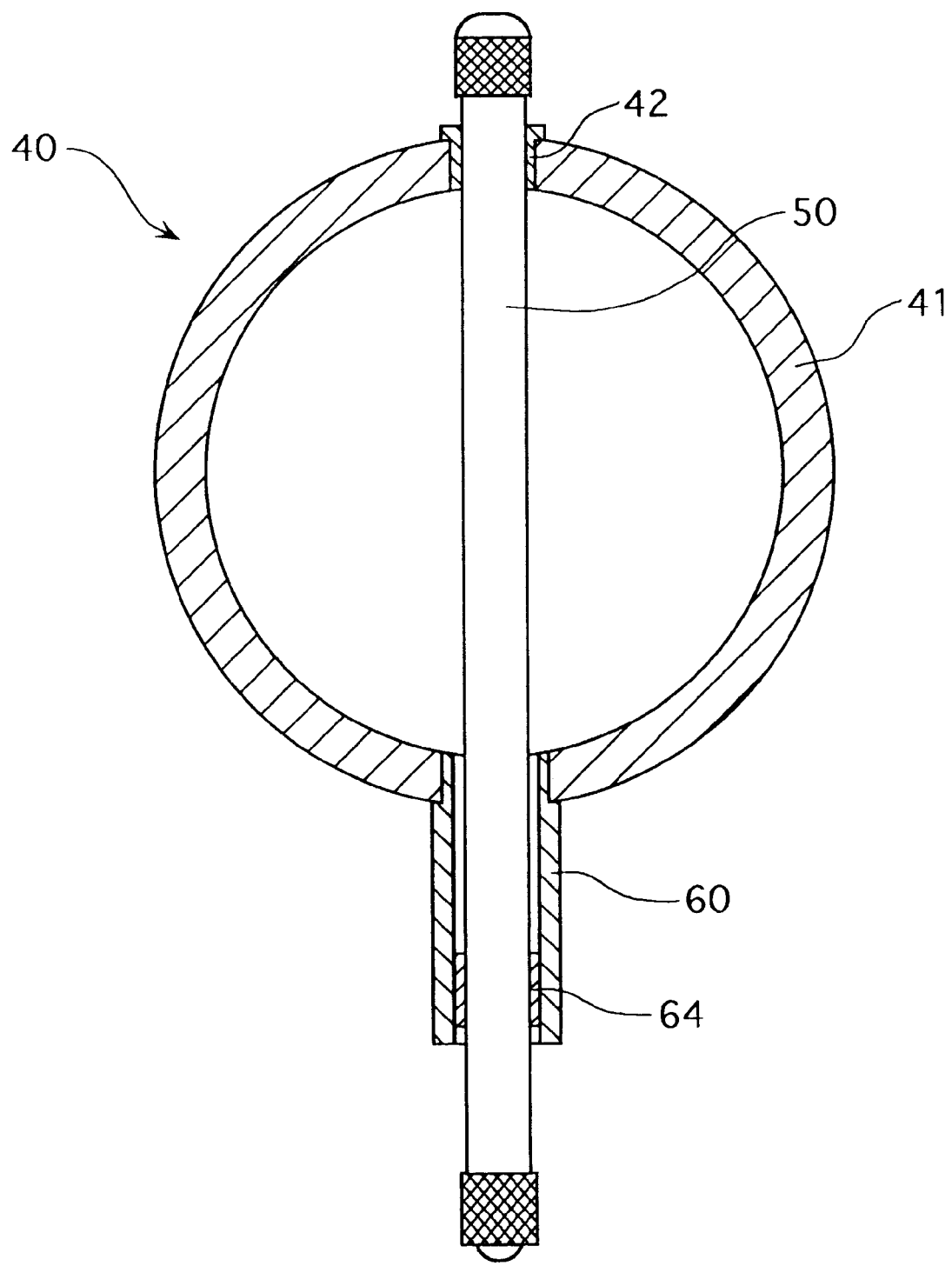
FIG. 12 is a sectional view showing the prior art case.

The fabrication of this case 340 will now be described with reference to FIG. 9.

The cylindrical bearings 343 and 344 are preliminary fabricated using an extrusion molder in advance to the step of molding the case 340.

For molding the case 340 using the die 150, the preliminary fabricated bearing 344 is set together with the stem 160 on the core pin 155 of the slidable die member 152, while setting the other bearing 434 on the core pin 156. Then, FRP which is obtained by reinforcing PPS with glass fiber is charged into the die 150, thus molding the case and making the peripheral wall 142 and the bearings 343 and 344 to be integral.

With this third embodiment, the following effects are obtainable in addition to the effects described before in connection with the previous embodiments.

With the bearings 343 and 344 formed separately from the remainder of the case 340 and made integral with the remainder when molding the case 340, it is possible to use inexpensive glass fiber as reinforcing material for the portion of the case 340 other than the bearings, for which portion satisfactory sliding property is not required, and use carbon fiber or other expensive reinforcing material only in a minimum necessary amount, thus reducing the material cost of the case 340.

In addition, since the bearings 343 and 344 are fabricated using an extrusion molder, it is possible to prepare extrusion dies inexpensively and produce bearings in correspondence to various spindle diameters.

The above embodiments of the invention are by no means limitative, and the following modifications are possible.

In the above embodiments, the bottom 141 and the peripheral wall 142 of the case 140 were molded integrally, but this is by no means limitative; for example, the invention is applicable to a dial gauge case, in which the bottom and the peripheral wall are fabricated separately. In general, any modification is possible so long as the peripheral wall and the bearings are made integral by molding using a plastic material.

The above embodiments concerned the case 140 used for a dial gauge comprising an enlarging mechanism constituted by a mechanical rack-and-pinion assembly, but this is by no means limitative; for example, the invention is applicable to a dial gauge, in which an extent of sliding is magnified and displayed by electric means.

In the above embodiments the case 140 was fabricated by extrusion molding, but this is by no means limitative; for example, it is possible to fabricate a case by extrusion compression molding.

In the above embodiments a plastic material obtained by reinforcing PPS with carbon fiber was used, but this is by no means limitative; for example, it is possible to use glass fiber for reinforcing the plastic material. It is further possible to use potassium titanate whisker, aluminum borate whisker, etc. to improve the sliding property of the bearings as well.

In the third embodiment the bearings 343 and 344 were cylindrical in shape, but this is by no means limitative; for example, it is possible to use bearings with protuberances formed on the outer periphery. Such protuberances can reinforce mechanical engagement of the bearings with the peripheral wall, and the bearings can be more firmly made integral.

Further changes and modifications in the details of the construction, shape, etc. are possible without departing from the scope of the invention.

What is claimed is:

1. A dial gauge case comprising a bottom and a peripheral wall surrounding the bottom, the bottom and the peripheral wall defining a recess for accommodating a dial gauge mechanism therein, the peripheral wall formed with a pair of cylindrical bearings for slidably supporting a spindle of the dial gauge mechanism, the peripheral wall and the bearings formed as a one-piece molding of a plastic material.

2. The dial gauge case according to claim 1, wherein the plastic material is a reinforced plastic obtained by reinforcing a synthetic resin composed of polyphenylene sulfide with a member of the group consisting of carbon fiber, glass fiber, potassium titanate whisker and aluminum borate whisker.

3. The dial gauge case according to claim 1, wherein the plastic material is a reinforced plastic for the pair of bearings obtained by reinforcing polyphenylene sulfide with a member of the group consisting of carbon fiber, potassium titanate wisker and aluminum borate whisker, and a reinforced plastic for the remainder of the case obtained by reinforcing polyphenylene sulfide with glass fiber.

4. The dial gauge case according to claim 1, wherein the peripheral wall is provided with a cylindrical stem projecting outward from it and accommodating the spindle, one of the bearings being provided at a stem end.

5. The dial gauge case according to claim 2, wherein the peripheral wall is provided with a cylindrical stem projecting outward from it and accommodating the spindle, one of the bearings being provided at a stem end.

6. The dial gauge case according to claim 3, wherein the peripheral wall is provided with a cylindrical stem projecting outward from it and accommodating the spindle, one of the bearings being provided at a stem end.

7. The dial gauge case according to claim 1, wherein the peripheral wall is provided with a cylindrical stem projecting from it and accommodating the spindle, one of the bearings being provided inside the stem.

8. The dial gauge case according to claim 2, wherein the peripheral wall is provided with a cylindrical stem projecting from it and accommodating the a spindle, one of the bearings being provided inside the stem.

9. The dial gauge case according to claim 3, wherein the peripheral wall is provided with a cylindrical stem projecting outward from it and accommodating a spindle, one of the bearings being provided inside the stem.

10. The dial gauge case according to claim 7, wherein the stem has a hole formed in a stem end and penetrating its cylindrical wall, the peripheral wall and the bearing being coupled together through the hole.

11. The dial gauge case according to claim 8, wherein the stem has a hole formed in a stem end and penetrating its cylindrical wall, the peripheral wall and the bearing being coupled together through the hole.

12. The dial gauge case according to claim 9, wherein the stem has a hole formed in a stem end and penetrating its cylindrical wall, the peripheral wall and the bearing being coupled together through the hole.

13. A method of manufacturing a dial gauge case, comprising:

a bottom and a peripheral wall surrounding the bottom, the bottom and the peripheral wall defining a recess for accommodating a dial gauge mechanism therein, the peripheral wall formed with a pair of cylindrical bearings for slidably supporting a spindle as a one-piece molding, the method comprising:

fabricating the cylindrical bearings from a first reinforced plastic obtained by reinforcing a synthetic resin composed of polyphenylene sulfide with a member of the group consisting of carbon fiber, potassium titanate whisker and aluminum borate whisker; and molding the peripheral wall from a second reinforced plastic material composed of polyphenylene sulfide with glass fiber with the bearings set in a die by insert molding, thereby making the peripheral wall and the bearings integral with one another.

14. The method of manufacturing a dial gauge case according to claim 13, wherein the plastic material used to mold the case is a reinforced plastic obtained by reinforcing a synthetic resin composed of polyphenylene sulfide with glass fiber.

15. A dial gauge case, comprising:

a bottom and a peripheral wall surrounding the bottom, the bottom and the peripheral wall defining a recess for accommodating a dial gauge mechanism therein, the peripheral wall formed with a pair of cylindrical bearings for slidably supporting a spindle of the dial gauge mechanism, the peripheral wall and the bearings formed as a one-piece molding of a plastic material, the dial gauge case made by a process of:

fabricating the cylindrical bearings from a first reinforced plastic obtained by reinforcing a synthetic resin composed of polyphenylene sulfide with a member of the group consisting of carbon fiber, potassium titanate whisker and aluminum borate whisker; and molding the peripheral wall from a second reinforced plastic material composed of polyphenylene sulfide with glass fiber with the bearings set in a die by insert molding, thereby making the peripheral wall and the bearings integral with one another.

16. The dial gauge case according to claim 15, wherein the plastic material used to mold the peripheral wall is a reinforced plastic obtained by reinforcing a synthetic resin composed of polyphenylene sulfide with glass fiber.

* * * * *